Jan. 20, 1953      L. SWANSON      2,625,861
WORK MOUNTING FIXTURE
Filed Nov. 8, 1946      2 SHEETS—SHEET 1
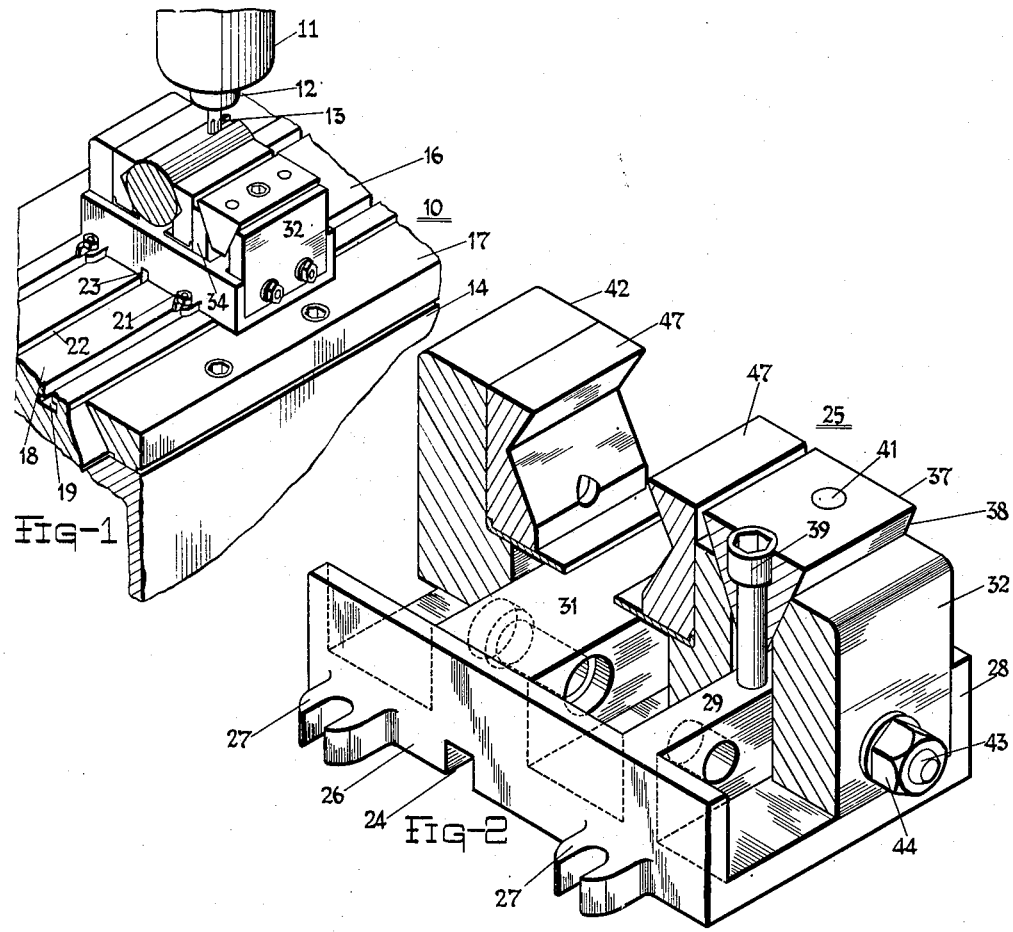
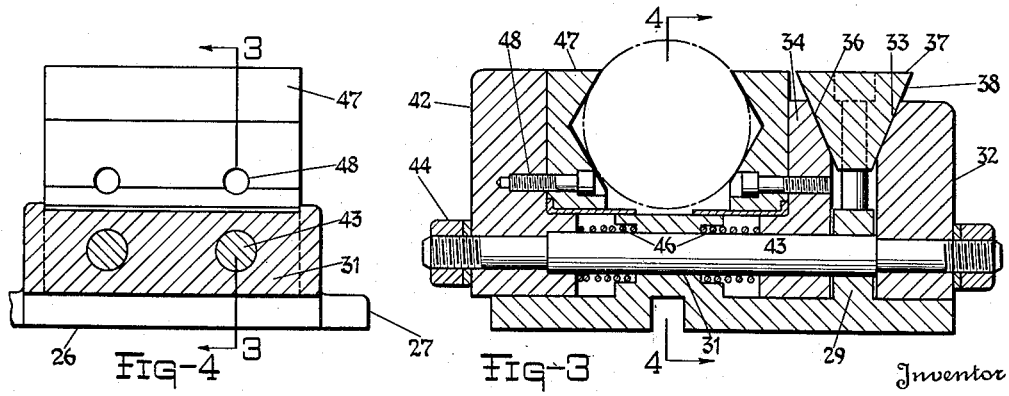
Inventor
Leonard Swanson.
By Richmond S. Hayes
Attorney Jan. 20, 1953  L. SWANSON  2,625,861
WORK MOUNTING FIXTURE
Filed Nov. 8, 1946  2 SHEETS—SHEET 2
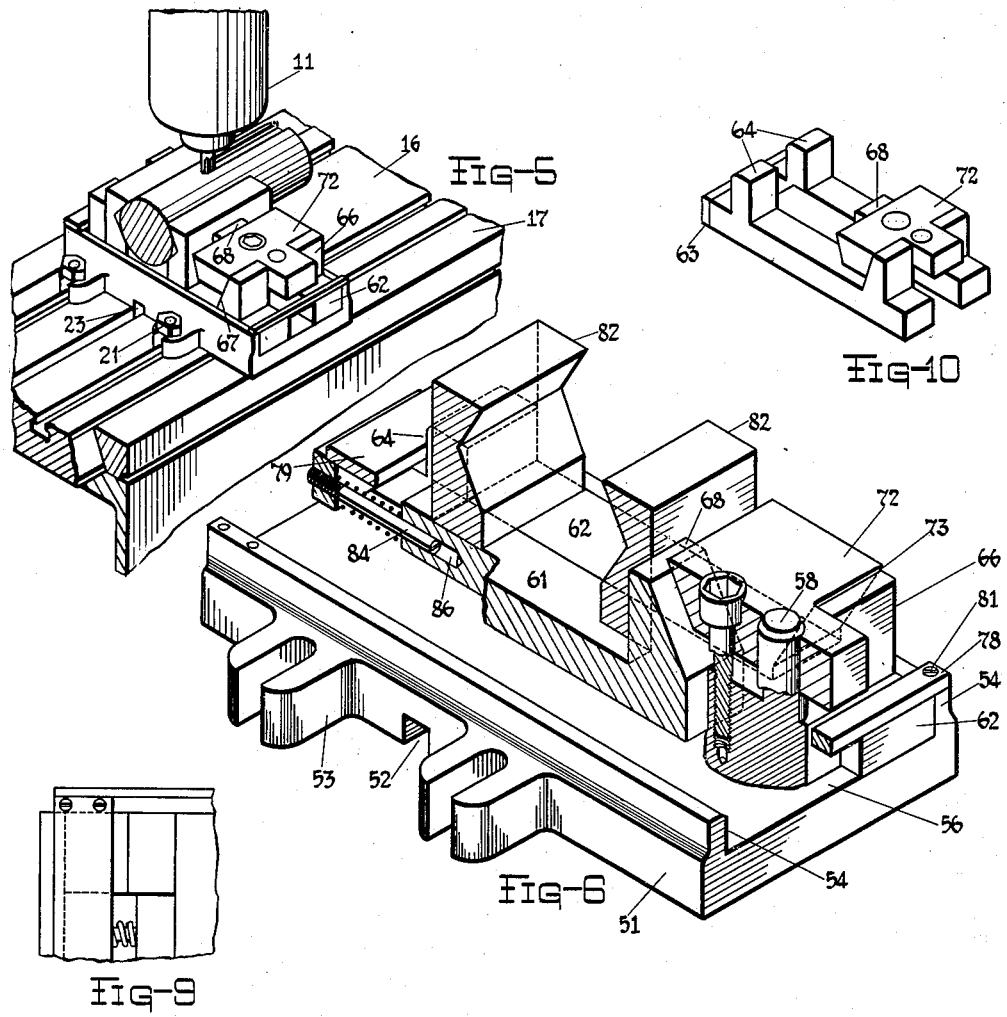
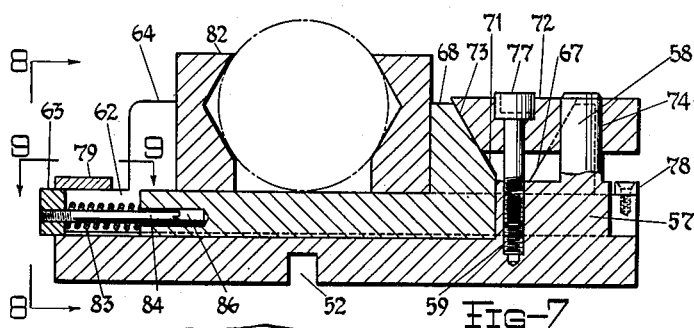
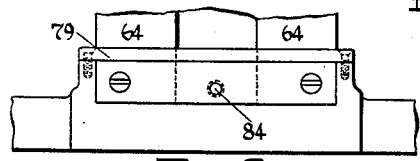
Inventor
Leonard Swanson
By Richmond H. Hayes
Attorney Patented Jan. 20, 1953

2,625,861

UNITED STATES PATENT OFFICE 2,625,861

WORK MOUNTING FIXTURE

Leonard Swanson, Erie, Pa., assignor to Swanson Tool & Machine Products, Inc., Erie, Pa., a corporation of Pennsylvania Application November 8, 1946, Serial No. 708,694

2 Claims. (Cl. 90—60)

This invention relates to improvements in work mounting fixtures such as may be utilized with the hand or power fed reciprocating work table of a milling machine.

In all metal working machines it is not only essential that the cutting tools be accurately and ruggedly mounted, but also that the work piece be secured against the slightest displacement during a cutting operation thereon. One type of machine in which the work piece must be rigidly mounted would be a vertical milling machine wherein a cutting tool, carried by an adjustable spindle, is driven about a vertical axis and a work piece moved in a horizontal plane into and out of operative relationship with the cutting tool. In this type of machine the head in which the spindle is carried is of necessity extremely rugged and, although this head may be laterally adjustable in some instances, in any given position of use it is rendered absolutely rigid in order that the tool may repeat its cut on the same or different pieces of work and each cut will be within prescribed tolerances. Generally speaking, the reciprocating tables of milling machines of this type are sufficiently rugged to withstand normal strains of usage, but regardless of the ruggedness or accurate mounting of a reciprocating table, the quality of the cut produced in a work piece is dependent in large measure on the type of fixture in which the work piece is secured and presented to the cutting tool. Machines of this type are frequently required to produce precision work on numerous pieces. For example, a machine of this type is frequently used in cutting keyways in shafts. In cutting these keyways it is often necessary to repeat the cut to obtain proper depth, and during such an operation the piece of work must not become out of alignment to an appreciable extent, or the cut produced will not be within usual tolerance limits. In quantity production of keyway cuts in shafts it is obviously essential that the cut in one shaft be identical with the cut in any other shaft. It is also of importance in quantity production that the work holding fixture not only be capable of rigidly securing a work piece, but also be provided with means by which the work piece may be released, removed, and another quickly, accurately, and easily substituted therefor, following a cutting operation.

It is a purpose and object of the present invention to provide a work mounting fixture that is adapted to be secured to the reciprocable table of a milling machine or the like.

It is another object of the invention to provide a work mounting fixture that, once mounted on a reciprocable table on center with a cutting tool, is readily adjustable to locate and rigidly secure a piece of work on exact center with a cutting tool.

Additionally, it is an object of the invention to provide a work mounting fixture that may be repeatedly adjusted to secure or release a piece of work without misaligning or otherwise affecting the center thereof with respect to the cutting tool of the machine with which it is used.

Other objects and advantages of the invention will be more fully understood from a consideration of the following specification, taken in conjunction with the accompanying drawings; and in which Fig. 1 is a fragmentary perspective view of a vertical milling machine, on the reciprocable table of which is secured a work mounting fixture embodying one form of the invention;

Fig. 2 is an enlarged perspective view of the work mounting fixture shown in Fig. 1, parts being broken away to show certain of the structural details;

Fig. 3 is a vertical sectional view, taken lengthwise of the fixture, substantially as suggested by the line 3—3 of Fig. 4;

Fig. 4 is a transverse vertical sectional view, taken substantially as indicated by the line 4—4 of Fig. 3;

Fig. 5 is a fragmentary perspective view of a portion of a milling machine showing a modification of the work mounting fixture in position of use;

Fig. 6 is an enlarged perspective view of the fixture shown in Fig. 5, parts being cut away to disclose certain of the operative details;

Fig. 7 is a vertical longitudinally extending sectional view of the fixture, further illustrating certain of the details shown in Fig. 6;

Fig. 8 is a fragmentary end view of the fixture, being taken substantially as indicated by the line 8—8 of Fig. 7;

Fig. 9 is a fragmentary plan view, taken substantially as indicated at 9—9 of Fig. 7; and Fig. 10 is a small perspective view showing the relatively slidable members of the fixture and the means for effecting movement thereof.

Referring to the drawings, the reference numeral 10 is employed to generally designate a portion of a milling machine of the vertical type wherein a head 11 mounts a spindle 12, which in turn carries a cutting tool 13. The base or bed 14 of the machine mounts a reciprocable table 16, accurately confined to a predetermined path of travel by a pair of guides 17. The upper surface 18 of the table may be formed with spaced T-slots 19 with which bolts 21 are engaged. Between the slots 19 and on the exact longitudinal center is a keyway 22 adapted to receive a key 23 which in turn engages the keyway 24 formed transversely in the base 26 of a work mounting fixture 25 that constitutes the present invention. Extending laterally from opposite sides of the base 26 are slotted lugs 27 which are adapted to receive the shanks of bolts 21 described as being carried by the table 16. When the fixture has been mounted on the key 23 and suitable nuts drawn down onto the bolts 21, the fixture is secured against misalignment or displacement with respect to the table.

The base 26 may be formed with upstanding sides 28 which are connected by transverse web portions 29 and 31. Mounted at one end of the base, adjacent the portion 29, is a block 32, the upper, inner edge of which is shown to be beveled, as at 33. Between the portions 29 and 31, a further block 34 is located. This block also rests on the base 26 and is movable lengthwise thereof within the limits defined by the web portions 29 and 31. The upper edge of block 34, on the side toward block 32, is formed with a beveled surface 36 corresponding to the surface 33. A further block 37, having tapered sides 38, is adapted to be mounted on and engaged with the beveled surfaces 33 and 36. A stud 39 projects through block 37 into a threaded opening in the web portion 29 and, of course, when this stud is turned down, block 37 is drawn downwardly, causing a lateral spreading apart of blocks 32 and 34. To prevent movement in any but a vertical direction, the block 37 may be guided by one or more studs which are secured to the portion 29 and extend upwardly into openings 41 in the block.

Mounted on the base 26, at the other end of the fixture, is a block 42. One or more sets of aligned openings in blocks 32, 34, and 42, and the web portions 29 and 31, permit assembly with a shaft 43. The ends of this shaft extend beyond the outer faces of blocks 32 and 42 and are fitted with suitable nuts 44. The ends of the opening in the web portion 31, through which the shaft 43 projects, are enlarged sufficiently to receive and position the ends of expansion springs 46. One of these springs exerts pressure between the portion 31 and block 42, whereas the other spring exerts pressure between portion 31 and block 34. Blocks 34 and 42 are adapted to support jaws 47. Accurate location of the jaws on the blocks is provided through the use of studs 48.

Since one of the principal advantages of the fixture described is to make possible the repeated mounting of one or many work pieces in alignment with a given cutting tool, the method by which this is accomplished is set out. It may be assumed that a shaft, such as shown in Figs. 1 and 3 in solid and dotted lines respectively, is to be mounted on the fixture 25. The jaws 47 are moved to an open position by backing off or loosening the stud 39. This permits springs 46 to expand and cause pressure to be exerted by blocks 32 and 34 upon the tapered surfaces of block 37. Thus, block 37 moves upwardly in the path defined by the guide pins in openings 41, as rapidly and to the same extent that the stud 39 is backed off. When the shaft or other work piece has been placed between jaws 47, stud 39 is turned down. This action causes the tapered block 37 to move downwardly, spreading blocks 32 and 34. Block 34 mounts one of the jaws 47 and is moved by its sliding contact with block 37 in the direction of the work piece, and block 32, being directly connected with block 42 through shaft 43, causes block 42, and the jaw 47 carried thereby, to also move into engagement with the work piece. It is evident that once the fixture 25 is secured, as shown and described, the center of the space between the jaws 47 will always be on center with the cutter 13 and, despite the size of the work piece or the number of times that the jaws are opened or closed to insert or remove work pieces, as cutting operations are completed, each piece will, when engaged by the jaws, be exactly on center with the cutter.

Reference is now had to a modification of the fixture heretofore described. In this instance (Figs. 5 to 10, inclusive), a base 51 is provided which includes a transversely disposed keyway 52. This keyway, of course, is adapted to receive the key 23 shown as the means for accurately locating the fixture on the table 16. Projecting laterally from the sides of the base are lugs 53 which, when the fixture has been properly located by the key 23, secure it, through the bolt and nut structure 21, to the table 16. Extending lengthwise of the base are upstanding sides 54. Adjacent one end, the flat portion 56 of the base is provided with, or has formed integral therewith, an upstanding block 57. Projecting upwardly from this block is a guide pin 58. The block 57 also includes a drilled and tapped opening 59. Adjustable members 61 and 62 are adapted to be mounted on the base. Two adjustable members 62 are shown in spaced parallelism adjacent the sides 54, and these members may be joined and secured by one or more plates 63. The spacing of the members 62 is only sufficient to permit entry and free relatively slidable movement of member 61 therebetween. Each of the members 62, at common ends, includes an upstanding fixed block 64, the inner surface of which is perpendicular to the member from which it extends. Adjacent their other ends, the members 62 are provided with fixed blocks 66. The inner face 67 of these last mentioned blocks is inclined at an angle comparable to that shown in the drawing. Member 61, at one end, is provided with an upstanding block 68, one side 69 of which is perpendicular to the member on which it is located. The other side 71 of this block is inclined at substantially the same angle as the faces 67 of blocks 66, only in a reversed direction.

The members 61 and 62 are, of course, intended to have relative slidable movement over the surface 56 of the base. To effect movement of these members, an adjusting wedge 72 is provided. This wedge is formed with sides 73, having the same angle of inclination as the heretofore mentioned inclined sides 67 and 71 of blocks 66 and 68 respectively. Two openings 74 and 76 are made in the wedge 72, opening 74 being of a diameter to receive the guide pin 58, and opening 76 of a diameter to receive a stud 77. When the wedge is mounted on pin 58, the tapped opening 59 registers with opening 76. The stud is then projected through the wedge opening into engagement with the threads of the opening 59. Rotation of the stud in a clockwise direction draws the wedge 72 downwardly, causing blocks 66 and 68 to move in opposite directions by reason of the action of the inclined sides of wedge 72 against the inclined sides of these blocks. For the purpose of preventing any vertical displacement of the members 61 and 62, suitable plates 78 and 79 are provided, being disposed transversely of the fixture base and secured to the upstanding sides 54, substantially as suggested, by means of screws 81. Any suitable jaws, such as indicated at 82, may be mounted, one against the inner vertical face of block 64 and the other against the vertical face of block 66.

It is believed assembly of the parts of this modification is clearly apparent from the drawings. When it is desired to secure a work piece, such as a shaft, indicated in dotted lines in Fig. 7, this piece is set between the open jaws 82. The stud 77 may now be rotated in a clockwise direction which serves to move the adjusting wedge 72 downwardly. Such movement causes blocks 64 and 68 to move toward each other and the jaws 82 to firmly engage the piece of work. Through the use of the adjusting wedge in the manner shown, the jaws are uniformly adjusted and cause a piece of work, regardless of size, to be on center with the center of the table 16. Since the piece of work is adapted to be exactly centered with the keyway 52 and this keyway is engaged by key 23, centered on the table, it is evident that both the work and fixture are centered not only with the table, but also with the cutting tool of the machine. When it is desired to remove a piece of work from the jaws 82, the stud 77 is rotated in a counterclockwise direction for the purpose of allowing the adjusting wedge 72 to move upwardly and the blocks 66 and 68 to move toward each other. To assure the ready opening of the jaws when the stud is rotated in the direction for this purpose, it is contemplated to provide a spring 83. This spring is shown mounted on a shaft 84, one end of which projects into an opening 86 in one end of the member 61, the other end being secured in any suitable manner to the end plate 63. When the jaws 82 are moved into engagement with a piece of work, spring 83 is compressed and, consequently, the force thereof, when the stud 77 is withdrawn, causes relative movement of members 61 and 62 in a direction to raise the wedge 72 and open the jaws 82.

From the foregoing it will be understood that when either of the fixtures shown and described is secured on center with the table 16, each work piece, when mounted, will be exactly on center with the cutting tool of the machine. Furthermore, any wear that may take place from repeated use of such a work fixture will occur uniformly on the inclined surfaces of the wedge 37 or 72 and the inclined contacting surfaces and, thus, there is little or no tendency for wear of the moving parts to in any way affect the accuracy with which the fixture is adapted to locate or center a work piece on the machine.

Although applicant has shown and described only two preferred modifications of the invention, it will be understood that the structure thereof is susceptible to modification insofar as such modification is within the spirit and scope of the invention as set out in the annexed claims.

Having thus set forth my invention what I claim as new and for which I desire protection by Letters Patent is:

1. In a machine of the class described, a work mounting fixture comprising a base, members mounted on said base for joint movement in opposite directions, jaw carrying blocks on said members engageable with a work piece, means on proximate parts of said members cooperating to form a wedge opening, an adjusting member carried by said base, a wedge portion on said adjusting member movable into said opening and spring means interposed between other proximate parts of said members, said spring means serving to move said members in a direction to move said jaw carrying blocks away from each other when said adjusting member is withdrawn from said opening.

2. In a machine of the class described, a work mounting fixture comprising a base, members mounted on said base for simultaneous movement in opposite directions, work piece engaging jaws on adjacent portions of said members, blocks secured to proximate parts of said members, said blocks cooperating to form a wedge shaped opening, an adjustable wedge carried by said base, opposite faces of said wedge being inclined toward each other and engaged with said spreading blocks and projecting into said opening, an adjusting screw operable to move said wedge in a direction to spread said wedge blocks to a common extent and cause said jaws to move toward each other to engage and secure a work piece, and spring means interposed between proximate parts of said members, said spring means serving to move said members in a direction to move said jaws away from each other when said adjusting screw is operated in a direction to withdraw said wedge from said opening.

LEONARD SWANSON.

REFERENCES CITED

The following references are of record in the file of this patent:

UNITED STATES PATENTS

| Number | Name | Date |
|---|---|---|
| 728,368 | Chambers | May 19, 1903 |
| 1,060,980 | Hammann | May 6, 1913 |
| 1,071,215 | Deckard | Aug. 26, 1913 |
| 1,471,118 | Gething | Oct. 16, 1923 |
| 1,511,298 | Petzold | Oct. 18, 1924 |
| 1,732,840 | Fuchs | Oct. 22, 1929 |
| 1,751,329 | Hancock | Mar. 18, 1930 |
| 2,242,487 | Swanson | May 20, 1941 |
| 2,514,292 | Paulson | July 4, 1950 |

FOREIGN PATENTS

| Number | Country | Date |
|---|---|---|
| 338,664 | Italy | Mar. 31, 1936 |
| 522,595 | Great Britain | June 21, 1940 |